(12) United States Patent
Charles (10) Patent No.: US 9,342,333 B2
(45) Date of Patent: May 17, 2016

(54) BACKEND CUSTOM CODE EXTENSIBILITY

(71) Applicant: Microsoft Technology Licensing, LLC, Redmond, WA (US)

(72) Inventor: Mathew I. Charles, Issaquah, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 13/829,957

(22) Filed: Mar. 14, 2013

(65) Prior Publication Data

US 2014/0282630 A1 Sep. 18, 2014

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |
| *G06F 9/455* | (2006.01) |
| *G06F 9/445* | (2006.01) |

(52) U.S. Cl.
CPC ........ *G06F 9/45504* (2013.01); *G06F 9/44521* (2013.01)

(58) Field of Classification Search
None
See application file for complete search history.

(56) References Cited

U.S. PATENT DOCUMENTS

| | | | | |
|---|---|---|---|---|
| 7,774,428 | B2* | 8/2010 | Yu | 709/218 |
| 7,840,967 | B1* | 11/2010 | Czajkowski et al. | 719/312 |
| 8,255,490 | B1 | 8/2012 | Porter et al. | |
| 8,336,023 | B2 | 12/2012 | Kuzsma, Jr. et al. | |
| 8,336,043 | B2 | 12/2012 | Lavery et al. | |
| 2007/0074187 | A1* | 3/2007 | O'Brien | 717/140 |
| 2009/0235353 | A1* | 9/2009 | Ammerlaan et al. | 726/22 |
| 2010/0180270 | A1* | 7/2010 | Williams et al. | 717/168 |
| 2011/0276951 | A1 | 11/2011 | Jain | |

FOREIGN PATENT DOCUMENTS

WO 2010151273 A1 12/2010

OTHER PUBLICATIONS

Anonymous, "Method and System for Enabling Testing of Front-End of Application Using Back-End Scaffolding Services," Oct. 15, 2012, IP.com No. IPCOM000222519D, 3 pages, retrieved from http://ip.com/pdf/ipcompad/IPCOM000222519D.pdf on Feb. 7, 2014.*
"Kumulos: Cloud Mobile Backend as a Service (MBaaS)", Retrieved at <<http://www.kumulos.com/>>, Retrieved Date: Mar. 13, 2013, p. 1.
"Engine Yard Cloud", Retrieved at<<https://www.engineyard.com/products/cloud>>, Retrieved Date: Mar. 11, 2013, pp. 5.
"The Cloud Starts Here™: Appcelerator Cloud Services (ACS)", Retrieved at <<http://www.appcelerator.com/cloud/>>, Retrieved Date: Mar. 12, 2013, pp. 3.

(Continued)

*Primary Examiner* — H S Sough
*Assistant Examiner* — William C Wood
(74) *Attorney, Agent, or Firm* — Kate Sullivan; Kate Drakos; Micky Minhas (57) ABSTRACT

Techniques are described herein that are capable of providing backend custom code extensibility. Such extensibility allows custom code to be automatically loaded dynamically (e.g., on-demand) in a runtime that is hosted by a backend-as-a-service (BaaS) module while the runtime is running to provide custom backend features that are defined by the custom code to an application in response to receipt of a request from the application.

20 Claims, 5 Drawing Sheets

(56) References Cited

OTHER PUBLICATIONS

"Oracle Right Now-Platform", Retrieved at <<http://www.oracle.com/us/media1/rightnow-platform-1574248.pdf>>, Retrieved Date: Mar. 11, 2013, pp. 2.

"VMware-vCloud Automation Center Extensibility Overview", Retrieved at<<https://www.vmware.com/files/pdf/products/vCloud/VMware-vCloud-Automation-Center-Extensibility-Overview.pdf>>, In White Paper of VMware, Dec. 2012, pp. 15.

\* cited by examiner

BACKEND CUSTOM CODE EXTENSIBILITY

BACKGROUND

Writing a secure, scalable cloud backend for an application (e.g., a mobile application) is relatively difficult. For instance, a developer typically performs a substantial amount of set up to get a web service application backend configured and running in the cloud. Consequently, many companies recently have begun to provide Backend-as-a-Service (BaaS) solutions in the cloud. Companies that offer BaaS solutions are referred to as BaaS providers. Such BaaS providers generally try to simplify development of applications by providing turnkey solutions for common needs such as analytics, authentication, authorization, collaboration, data processing, persistent storage, push notifications, social networking, user management, etc. By using BaaS solutions, developers may focus on developing their application logic, rather than spending a substantial amount of time building the foundational backend for hosting their application logic.

However, conventional BaaS solutions offered by BaaS providers are rather inflexible. For instance, each BaaS solution traditionally provides a predetermined set of functionalities that cannot be modified by a developer. If a developer wishes to have a particular functionality that is not provided by a BaaS solution, the developer typically may either forego the particular functionality or manually create his/her own web service application backend, which is capable of providing the particular functionality, in lieu of using the BaaS solution.

SUMMARY

Various approaches are described herein for, among other things, providing backend custom code extensibility. Such extensibility allows custom code to be automatically loaded dynamically in a runtime that is hosted by a BaaS module while the runtime is running to provide custom backend features that are defined by the custom code to an application in response to receipt of a request from the application.

An example method is described. In accordance with this method, custom code is received for incorporation into a BaaS module that is configured to provide a backend service to a corresponding application. In response to receipt of a request from the corresponding application, the custom code is automatically loaded dynamically in a runtime hosted by the BaaS module while the runtime is running to provide custom backend features that are defined by the custom code to the corresponding application.

An example system is described that includes an interface and auto-load logic. The interface is configured to receive custom code for incorporation into a BaaS module that is configured to provide a backend service to a corresponding application. The auto-load logic is configured to automatically load the custom code dynamically in a runtime hosted by the BaaS module while the runtime is running to provide custom backend features that are defined by the custom code to the corresponding application in response to receipt of a request from the corresponding application.

A computer program product is described that includes a computer-readable medium having computer program logic recorded thereon for enabling a processor-based system to providing backend custom code extensibility. The computer program product includes a program logic module for enabling the processor-based system to automatically load custom code, which is configured for incorporation into a BaaS module, dynamically in a runtime hosted by the BaaS module while the runtime is running to provide custom backend features that are defined by the custom code to a corresponding application in response to receipt of a request from the corresponding application. The BaaS module is configured to provide a backend service to the corresponding application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of providing backend custom code extensibility. Such extensibility allows custom code to be automatically loaded dynamically (e.g., on-demand) in a runtime that is hosted by a BaaS module while the runtime is running to provide custom backend features that are defined by the custom code to an application in response to receipt of a request from the application.

Example techniques described herein have a variety of benefits as compared to conventional backend-as-a-service (BaaS) techniques. For instance, the example techniques may be capable of running custom code (e.g., business logic) within a BaaS module. The custom code may be run in the same process (e.g., a runtime in the BaaS module) that processes a request to execute the custom code. The runtime may be a web application, for example. The example techniques may be capable of pushing the custom code to the runtime without necessitating that the runtime be re-loaded. Accordingly, the custom code may be inserted into the runtime without interfering with execution of the runtime. The custom code may be run in its native execution platform. For operations with an implicit default behavior, the custom code may explicitly invoke a default operation. Moreover, the example techniques may allow inputs of the default operation to be modified before execution of the operation and/or outputs of the default operation to be modified after execution of the operation.

Figure 1:
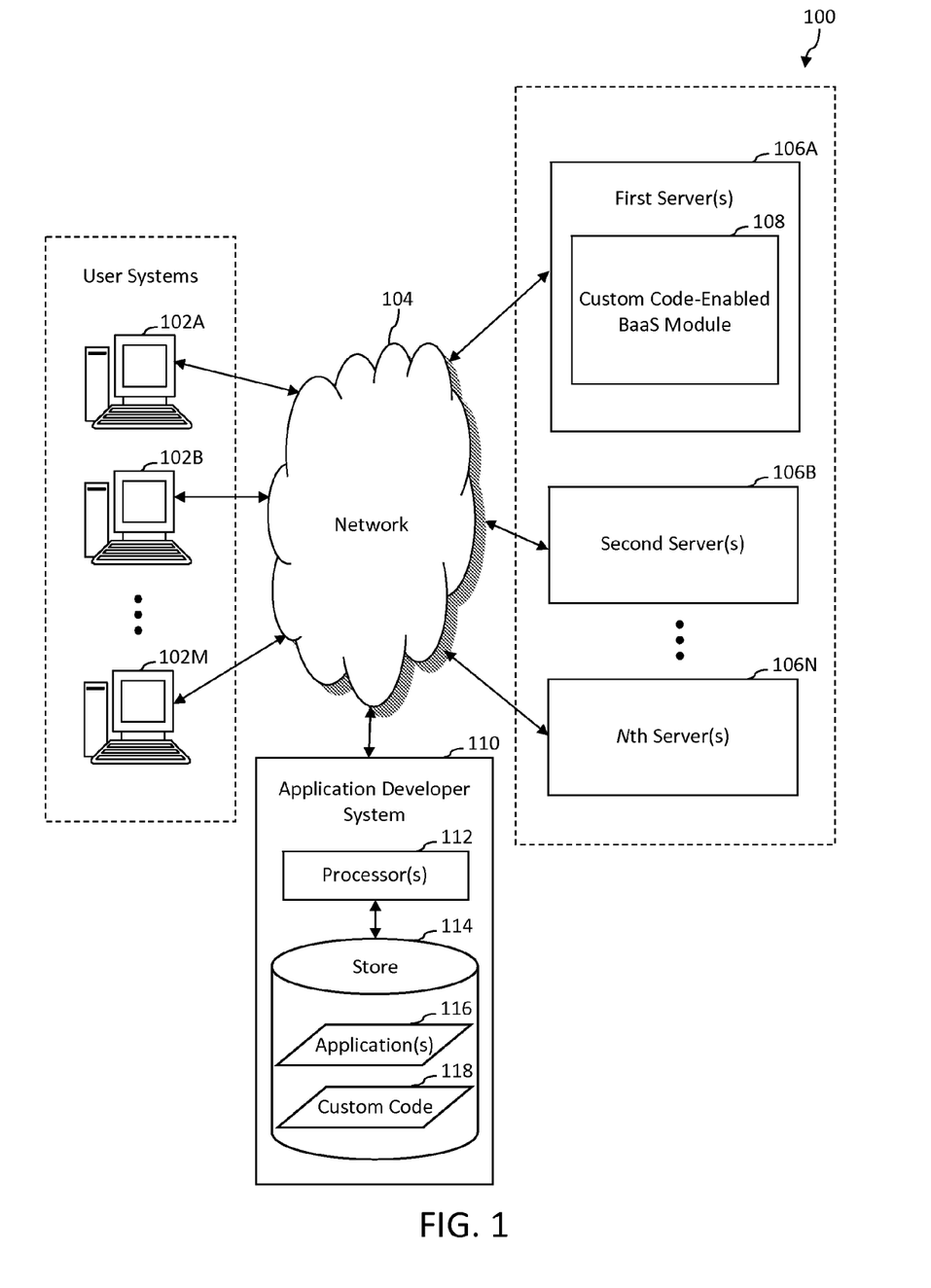
FIG. 1 is a block diagram of an example networked system in accordance with an embodiment.

FIG. 1 is a block diagram of an example networked system 100 in accordance with an embodiment. Generally speaking, networked system 100 operates to provide information to users in response to requests (e.g., hypertext transfer protocol (HTTP) requests) that are received from the users. The information may include documents (e.g., Web pages, images, video files, etc.), output of executables, and/or any other suitable type of information. In accordance with example embodiments described herein, networked system 100 provides backend custom code extensibility. Detail regarding techniques for providing backend custom code extensibility is provided in the following discussion.

As shown in FIG. 1, networked system 100 includes a plurality of user systems 102A-102M, a network 104, a plurality of servers 106A-106N, and an application developer system 110. Communication among user systems 102A-102M, servers 106A-106N, and application developer system 110 is carried out over network 104 using well-known network communication protocols. Network 104 may be a wide-area network (e.g., the Internet), a local area network (LAN), another type of network, or a combination thereof.

User systems 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. User systems 102A-102M are configured to provide requests to servers 106A-106N for requesting information stored on (or otherwise accessible via) servers 106A-106N. For instance, a user may initiate a request for executing a computer program (e.g., an application) using a client (e.g., a Web browser, Web crawler, or other type of client) deployed on a user system 102 that is owned by or otherwise accessible to the user. In accordance with some example embodiments, user systems 102A-102M are capable of accessing domains (e.g., Web sites) hosted by servers 104A-104N, so that user systems 102A-102M may access information that is available via the domains. Such domain may include Web pages, which may be provided as hypertext markup language (HTML) documents and objects (e.g., files) that are linked therein, for example.

It will be recognized that any one or more user systems 102A-102M may communicate with any one or more servers 106A-106N. Although user systems 102A-102M are depicted as desktop computers in FIG. 1, persons skilled in the relevant art(s) will appreciate that user systems 102A-102M may include any client-enabled system or device, including but not limited to a desktop computer, a laptop computer, a tablet computer, a personal digital assistant, a cellular telephone, or the like.

Servers 106A-106N are processing systems that are capable of communicating with user systems 102A-102M. Servers 106A-106N are configured to execute computer programs that provide information to users in response to receiving requests from the users. For example, the information may include documents (e.g., Web pages, images, video files, etc.), output of executables, or any other suitable type of information. In accordance with some example embodiments, servers 106A-106N are configured to host respective Web sites, so that the Web sites are accessible to users of networked system 100.

One example type of computer program that may be executed by one or more of servers 106A-106N is a developer tool. A developer tool is a computer program that performs diagnostic operations (e.g., identifying source of problem, debugging, profiling, controlling, etc.) with respect to program code. Examples of a developer tool include but are not limited to a web development platform (e.g., Windows Azure Platform®, Amazon Web Services®, Google App Engine®, VMWare®, Force.com®, etc.) and an integrated development environment (e.g., Microsoft Visual Studio®, JDeveloper®, NetBeans®, Eclipse Platform™, etc.). It will be recognized that the example techniques described herein may be implemented using a developer tool.

First server(s) 106A is shown to include a custom code-enabled backend-as-a-service (BaaS) module 108 for illustrative purposes. Custom code-enabled BaaS module 108 is configured to provide a backend service to an application. Custom code-enabled BaaS module 108 is further configured to accept custom code for incorporation into custom code-enabled BaaS module 108. For instance, custom code may be received at custom code-enabled BaaS module 108 from a software developer (e.g., application developer system 110 described below) for incorporation into custom code-enabled BaaS module 108. When a user system (e.g., any of user systems 102A-102M) runs the application, the application may initiate a request for the backend service of custom code-enabled BaaS module 108. Upon receipt of the request, custom code-enabled BaaS module 108 may load the custom code dynamically in a runtime that is hosted by custom code-enabled BaaS module 108 to provide custom backend features that are defined by the custom code to the application (e.g., in addition to non-custom backend features inherent to custom code-enabled BaaS module 108). In this manner, the application running on the user system and the runtime which incorporates the custom code may collaboratively provide a rich user experience.

It will be recognized that custom code-enabled BaaS module 108 may be (or may be included in) a developer tool, though the scope of the example embodiments is not limited in this respect. Example techniques for providing backend custom code extensibility are discussed in greater detail below with reference to FIGS. 2-4.

Application developer system 110 is a processing system that is capable of providing custom code to custom code-enabled BaaS module 108. Application developer system 110 includes processor(s) 112 and store 114. Processor(s) 112 are capable of developing application(s) 116 and custom code 118 in response to instructions from a software developer. Store 114 is configured to store the application(s) 116, the custom code 118, and other suitable information. Such other information may include software development kits (SDKs), for example. An SDK provides functionality for an application (a.k.a. a connected client) to communicate with custom code-enabled BaaS module 108. The SDK is tailored to each backend service and connects endpoints automatically without a software developer having to do additional work. Store 114 may be any suitable type of store, including but not limited to a database (e.g., a relational database, an entity-relationship database, an object database, an object relational database, an XML database, etc.). One application developer system 110 is shown in FIG. 1 for purposes of illustration and is not intended to be limiting. It will be recognized that networked system 100 may include any suitable number (e.g., 1, 2, 3, etc.) of application developer systems, each capable of custom code to custom code-enabled BaaS module 108.

Application developer system 110 may provide the custom code 118 to custom code-enabled BaaS module via an interface, such as a web portal and/or command line tool(s) of custom code-enabled BaaS module 108, and/or via direct code push to a runtime in custom code-enabled BaaS module 108. The end result is that custom code-enabled BaaS module 108 is aware of the custom code 118 and knows how to run the custom code 118 at the right times.

Custom code-enabled BaaS module 108 may be implemented in various ways to provide backend custom code extensibility, including being implemented in hardware, software, firmware, or any combination thereof. For example, custom code-enabled BaaS module 108 may be implemented as computer program code configured to be executed in one or more processors. In another example, custom code-enabled BaaS module 108 may be implemented as hardware logic/electrical circuitry. In an embodiment, custom code-enabled BaaS module 108 may be implemented in a system-on-chip (SoC). Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Custom code-enabled BaaS module 108 is shown to be incorporated in first server(s) 106A for illustrative purposes and is not intended to be limiting. It will be recognized that custom code-enabled BaaS module 108 may be distributed among the two or more of server(s) 106A-106N.

Figure 2:
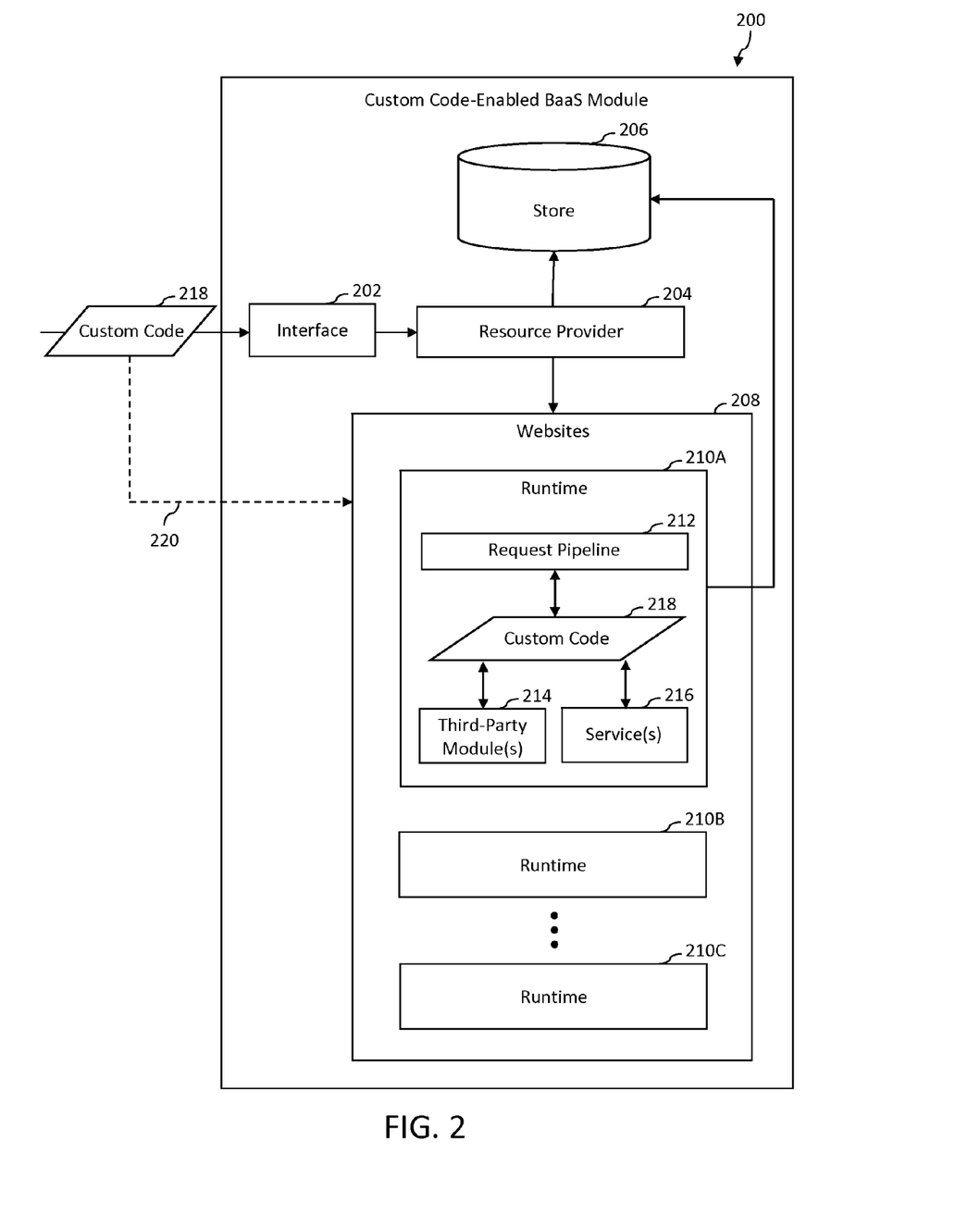
FIG. 2 is a block diagram of an example implementation of a custom code-enabled BaaS module in accordance with an embodiment.

FIG. 2 is a block diagram of an example implementation of a custom code-enabled BaaS module in accordance with an embodiment. As shown in FIG. 2, custom code-enabled BaaS module 200 includes an interface 202, a resource provider 204, a store 206, and websites 208. Interface 202 is configured to receive custom code 218 (e.g., from application developer system 110). For example, interface 202 may include a browser-based portal, command line utilities, etc. Interface 202 forwards the custom code 218 to resource provider 204 for further processing. It will be recognized that interface 202 is shown for illustrative purposes, and custom code-enabled BaaS module need not necessarily include interface 202. For instance, a software developer may communicate directly with websites 208 via link 220 (e.g., using a push operation).

Resource provider 204 is configured to provision runtimes to run within a cloud environment. For example, resource provider 204 provisions runtimes 210A-210C to run in websites 208. In accordance with this example, resource provider 204 may configure runtimes 210A-210C based on user preferences for handling backend features including but not limited to authentication, user and device management, push notifications, scheduled tasks, etc. In addition to configuring runtimes 210A-210C, resource provider 204 is capable of pushing custom code (a.k.a. code snippets or scripts) to runtimes 210A-210C. For instance, custom code 218 is shown in FIG. 2 to have been pushed to runtime 210A by resource provider 204. The custom code 218 may include one or more custom code extensions, such as table script(s), cron script(s), application programming interface (API) script(s), shared script(s), etc.

Runtime 210A handles business logic specific to an application that corresponds to the custom code 218. For example, client-side aspects of the application may run on a user system (e.g., any of user systems 102A-102M), and server-side aspects of the application, including the custom code 218, may run in runtime 210A. By enabling a software developer to directly add behavior to runtime 210A, it is possible to hook in an open-ended set of features that the software developer can leverage as part of the overall application.

Resource provider 204 may be implemented as a Web API exposing a representational state transfer-style (REST-style) API which is accessible using a language such as JavaScript™ Object Notation (JSON) or extensible markup language (XML), though the scope of the example embodiments are not limited in this respect. Such a REST-style API allows resource provider 204 to be configured by a variety of clients ranging from a browser-based portal-like experience to command line utilities. The Web resources that resource provider 204 exposes provide workflows for creating, provisioning, monitoring and tracking applications (e.g., a Windows Azure® Mobile Application). Resource provider 204 maintains the state of each application in store 206.

Store 206 is configured to store the state of each application. Store 206 may be any suitable type of store. One type of store is a database. For example, store 206 may be a relational database, an entity-relationship database, an object database, an object relational database, an extensible markup language (XML) database, etc. In accordance with this example, store 206 may be a persistent database.

Custom code-enabled BaaS module 200 hosts websites 208 in which runtimes 210A-210C run. Each of the runtimes 210A-210C is a dedicated service running the backend functionality of an application. Runtime 210A is shown to include a request pipeline 212, custom code 218 automatically loaded dynamically at runtime by resource provider 204, third-party module(s) 214 (e.g., node.js modules), and service(s) 216. Request pipeline 212 receives incoming requests from an application. Request pipeline 212 handles such aspects as authentication, push notification, database access and data model definition. The aforementioned aspects are provided for illustrative purposes and are not intended to be limiting. It will be recognized that request pipeline may handle any suitable aspects of the backend functionality of custom code-enabled BaaS module. The custom code 218 is loaded and run at particular points (referred to as "extensibility points") along request pipeline 212 by runtime 210A. It should be noted that runtime 210A monitors the custom code 218 while the custom code 218 runs to ensure that the application remains responsive in case of a failure and/or bug in the custom code 218. Error messages and status updates are logged along the request pipeline 212 by resource provider 204 in a way that the software developer can inspect. Within runtime 210A, the custom code 218 is capable of communicating with third-party module(s) 214 and service(s) 216 (e.g., build-in service(s)).

Runtime 210A may be configured to expose any of a variety of endpoints which connected endpoints can access:

/login: The login endpoint supports authentication of a user using a number of popular Internet Identity Providers.

/table: The table endpoint exposes a structured, persistent storage which connected applications can use for storing or accessing data that is part of the application.

/jobs: The jobs endpoint exposes a scheduled task which can be run at a predetermined point in time or in a "run-now" mode.

/status: The status endpoint exposes information about runtime 210A and how runtime 210A performs.

/api: The api endpoint exposes software developer-defined "custom APIs". The software developer authors a custom code script which can expose one or more "methods" (e.g., scores, topScores, etc.). The methods are then accessible at endpoints, such as /api/scores, /api/topScores, etc.

For operations with an implicit default behavior, the custom code 218 may be capable of explicitly invoking a base "default" operation. For example, data storage CREATE/READ/UPDATE/DELETE (CRUD) logic operation code, the default operation is to simply perform the storage operation. This allows rich pre-operation scenarios in which the inputs of the operation are modified before the operation executes. It also allows post-operation scenarios in which results of the operation are modified after performance of the operation.

As described above, the custom code 218 may run in the same process as the code processing the request (i.e., in runtime 210A). This means that the custom code 218 may be deeply integrated into the request pipeline 212 without requiring expensive inter-process communication or calls out to remote execution services.

Moreover, the custom code 218 may be capable of leveraging its native execution platform. For example, for JavaScript™ code, the execution platform is node.js, and that fact is not hidden from the custom code 218. The custom code 218 may require third-party node.js modules and use them.

Accordingly, the custom code 218 is integrated into the request pipeline 212 in a very natural way—not much differently from how such a service would be hand crafted by a software developer if the software developer were not using a BaaS. This in-process model provides the aforementioned deep integration benefits.

Taking the node.js/JavaScript™ custom code platform as an example, below are details on how the custom code 218 is executed in the request pipeline 212. For custom code in other languages (e.g., C#), the pattern would be the same—an application runtime (e.g. runtime 210A) written on the native platform (e.g., .NET), calling out to the custom code 218. In this example, runtime 201A is described as a node.js application, which serves as the execution environment for the custom code 218. Runtime 210A may be run under IIS Node in Windows Azure® as an Azure Web Site, for example, which provides a single tenant sandbox that isolates runtime 210A from runtimes 210B-210C. Accordingly, are not capable of interfering with data within runtime 210A. For instance, the single tenant sandbox may prevent runtimes 210B-210C from running on the same node as runtime 210A. The custom code 218 may reside in runtime 210A as script file(s) under any suitable directory structure. A variety of such directory structures are well-known in the relevant art(s).

In accordance with the example above, when runtime 210A starts up, based on service configuration metadata specified by the software developer, runtime 210A initializes the set of routes or HTTP endpoints to monitor for requests. For requests that involve custom code, the custom code is loaded and run at the appropriate point in the request pipeline 212. Following is an example of how custom code 218 is run. (1) The custom code 218 may be loaded into runtime 210A as a node module. (2) The custom code 218 may export a function that implements an operation. (3) Runtime 210A may call this function and pass parameter(s) into the function. (4) A request parameter that is passed into the function enables the custom code 218 to respond to or reject the request. (5) A context parameter is also available to the custom code 218, providing access to a variety of other services, such as services) 216. After the custom code 218 has finished its asynchronous execution, the response that is provided by the custom code 218 is returned to the external client (e.g., any of user systems 102A-102M in FIG. 1).

Following is an example script for an insert operation, demonstrating a few of the capabilities described above:

```
exports.read = function (query, request) {
    // apply additional filtering to the query
    // prior to execution
    query.where(function ( ) {
        return !this.discontinued;
    });
    // invoke the read operation
    request.execute({
        success: function (results) {
            request.respond(200, results);
        },
        error: function (err) {
            console.error(err);
            request.respond(500);
        }
    });
};
```

The script above uses a node.js export to surface the custom code to the runtime for illustrative purposes and is not intended to be limiting. The script performs a pre-operation before the underlying operation by adding an additional query predicate. The script also calls request.execute to invoke the default query operation.

Following is another example script, which demonstrates a few more of the capabilities described above. This example is a cron script, which is a script that is run on a user-defined (e.g., developer-defined) periodic interval. The script periodically loads the latest news headlines and pushes the news headlines to registered users.

```
var Pusher = require('pusher');
exports.sendNewsNotifications = function (context) {
    var pusher = new Pusher({ /* credentials */ });
    getLatestNews(context, function (newsItems) {
        newsItems.forEach(function (newsItem) {
            pusher.trigger('news-updates', 'new-item', newsItem);
        });
    });
};
function getLatestNews(context, callback) {
    var newsFeed = context.tables.getTable('feed'),
        lastUpdated; // <retrieve last updated>
    // <query the news table to get most recent>
    f  newsFeed
        .where(function ( ) { this.createDate > lastUpdated; })
```

-continued

```
.read({
    success: function (newsItems) {
        callback(newsItems);
    }
});
}
```

The script above utilizes a third-party push notification module "pusher" to send push notifications. This demonstrates the benefits of running script in a native execution environment—an ecosystem of modules (e.g., libraries) is available for use to the custom code.

It will be recognized that custom code-enabled BaaS module 200 may not include one or more of the components shown in FIG. 2. For instance, custom code-enabled BaaS module 200 may not include any one or more of interface 202, store 206, websites 208, third-party module(s) 214, and/or service(s) 216. Furthermore, custom code-enabled BaaS module 200 may include component(s) in addition to or in lieu of those shown in FIG. 2.

Figure 3:
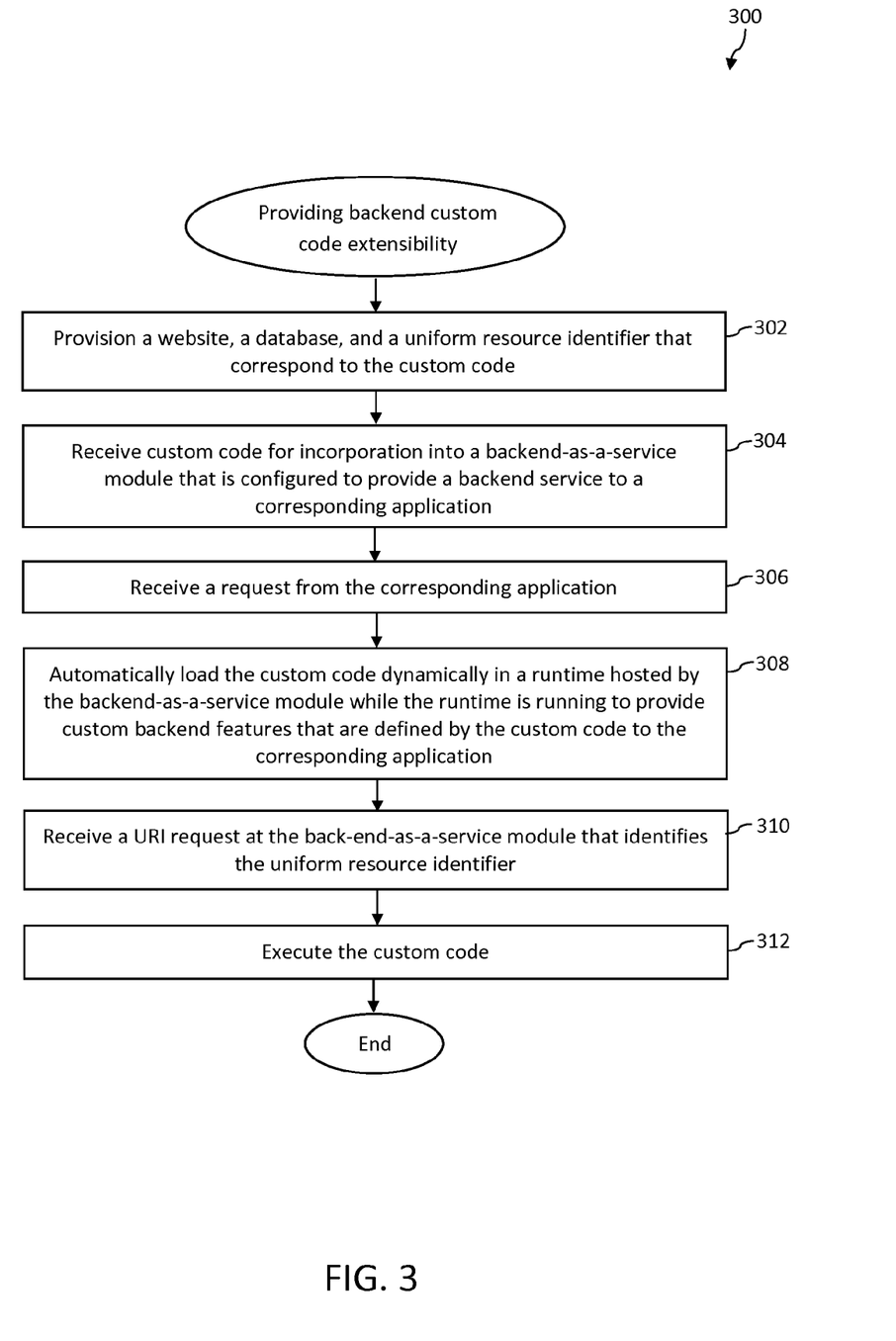
FIG. 3 depicts a flowchart of an example method for providing backend custom code extensibility in accordance with an embodiment.
Figure 4:
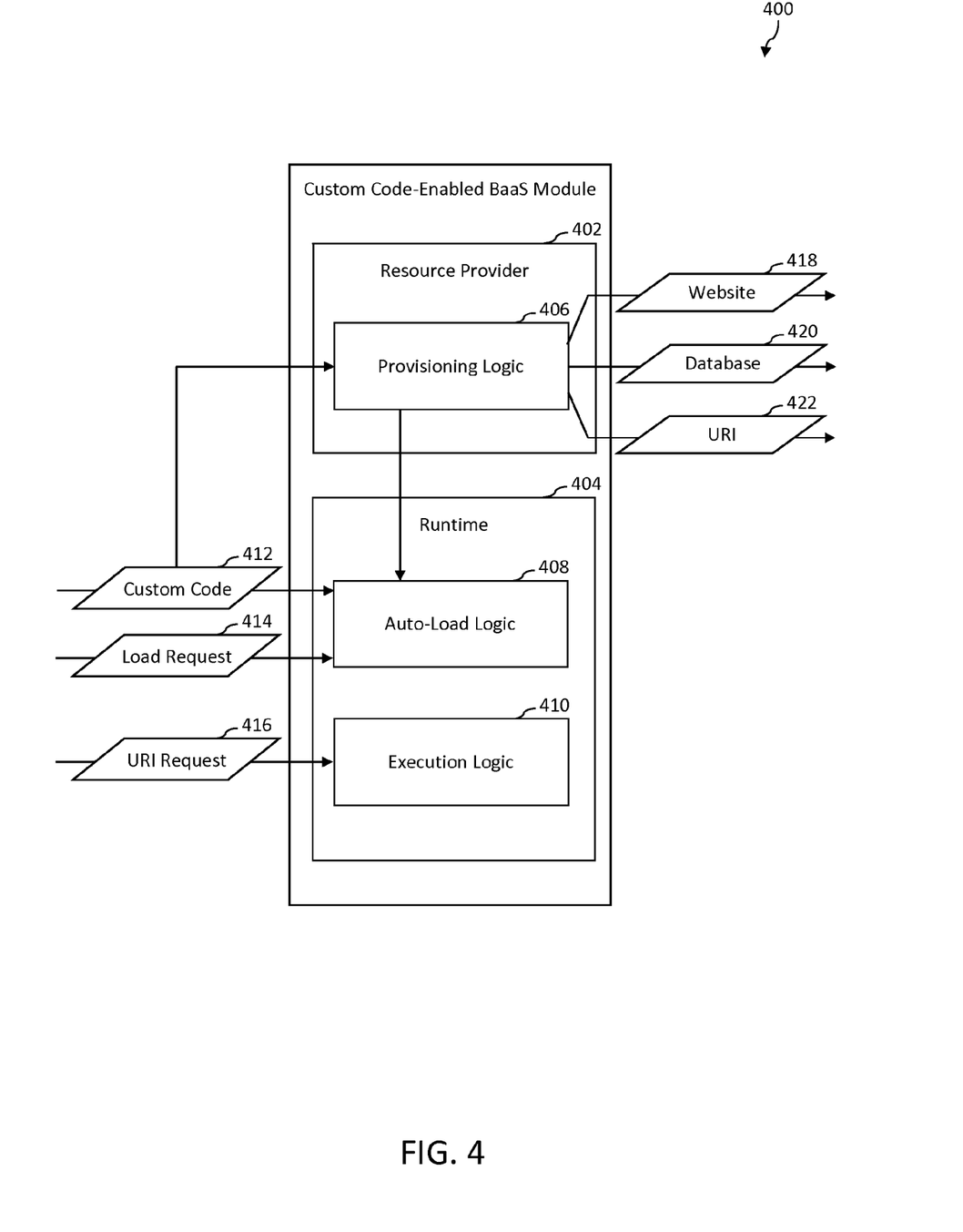
FIG. 4 is a block diagram of an example implementation of a resource provider in accordance with an embodiment.

FIG. 3 depicts a flowchart 300 of an example method for providing backend custom code extensibility in accordance with an embodiment. Flowchart 300 may be performed by custom code-enabled BaaS module 108 shown in FIG. 1 or custom code-enabled BaaS module 200 shown in FIG. 2, for example. For illustrative purposes, flowchart 300 is described with respect to custom code-enabled BaaS module 400 shown in FIG. 4, which is an example of custom code-enabled BaaS modules 108 and 200, according to an embodiment. As shown in FIG. 4, custom code-enabled BaaS module 400 includes resource provider 402 and runtime 404. Resource provider 402 includes provisioning logic 406. Runtime 404 includes auto-load logic 408 and execution logic 410. Further structural and operational embodiments will be apparent to persons skilled in the relevant art(s) based on the discussion regarding flowchart 300.

As shown in FIG. 3, the method of flowchart 300 begins at step 302. In step 302, a website, a database, and a uniform resource identifier (URI) are provisioned. A runtime may run in the website. The URI may be a uniform resource name (URN) or a uniform resource locator (URL), for example. In an example implementation, provisioning logic 406 provisions a website 418, a database 420, and a URI 422. In accordance with this implementation, provisioning logic 406 provisions runtime 404 to run in the website 418. Runtime 404 is isolated from other runtimes in custom code-enabled BaaS module such that the other runtimes do not have access to the custom code 412 and do not have access to data on which the custom code 412 operates.

At step 304, custom code is received for incorporation into a backend-as-a-service module that is configured to provide a backend service to a corresponding application. The custom code may be received from a user, such as a software developer, for example. In an example implementation, auto-load logic 408 receives custom code 412 for incorporation into runtime 404 of custom code-enabled BaaS module 400. For example, provisioning logic 406 may receive the custom code 412 and forward the custom code 412 to auto-load logic 408 for further processing. In another example, auto-load logic 408 may receive the custom code 412 directly from the software developer (e.g., via a push operation).

At step 306, a request from the corresponding application is received. In an example implementation, auto-load logic 408 receives load request 414 from the corresponding application.

At step 308, the custom code is automatically loaded dynamically in a runtime hosted by the backend-as-a-service module while the runtime is running to provide custom backend features that are defined by the custom code to the corresponding application. For example, the runtime may be a native runtime of the custom code. In another example, the runtime may be implemented as a Web application. In an example implementation, auto-load logic 408 automatically loads the custom code 412 dynamically in runtime 404, which is hosted by custom code-enabled BaaS module 400, while the runtime 404 is running.

In an example embodiment, the custom code is operable (e.g., configured) to access third-party code modules that are external to the custom code. In another example embodiment, the custom code is operable to explicitly invoke a default operation and to modify one or more inputs of the default operation before the default operation is performed. In yet another example embodiment, the custom code is operable to explicitly invoke a default operation and to modify one or more outputs of the default operation by the custom code after the default operation is performed. In still another example embodiment, the custom code is operable to call into the runtime to use one or more services that are provided by the runtime. Such services may include but are not limited to push notifications for push platforms, database operations, etc.

At step 310, a URI request that identifies the uniform resource identifier is received at the back-end-as-a-service module. In an example implementation, execution logic 410 receives a URI request 416, which identifies the URI 422.

At step 312, the custom code is executed. In an example implementation, execution logic 410 executes the custom code 412.

It will be recognized by persons skilled in the relevant art(s) that any one or more of the steps described above may be performed automatically. In some example embodiments, one or more steps 302, 304, 306, 308, 310, and/or 312 of flowchart 300 may not be performed. Moreover, steps in addition to or in lieu of steps 302, 304, 306, 308, 310, and/or 312 may be performed.

It will be recognized that custom code-enabled BaaS module 400 may not include all of the components shown in FIG. 4. For instance, custom code-enabled BaaS module 400 may not include one or more of resource provider 402, provisioning logic 406, auto-load logic 408, and/or execution logic 410. Furthermore, custom code-enabled BaaS module 400 may include components in addition to or in lieu of resource provider 402, runtime 404, provisioning logic 406, auto-load logic 408, and/or execution logic 410.

Any one or more of user systems 102A-102M, any one or more of servers 106A-106N, application developer system 110, custom code-enabled BaaS module 108, interface 202, resource provider 204, runtimes 210A-210C, request pipeline 212, third-party module(s) 214, service(s) 216, resource provider 402, runtime 404, provisioning logic 406, auto-load logic 408, execution logic 410, and/or flowchart 300 may be implemented in hardware, software, firmware, or any combination thereof.

For example, any one or more of user systems 102A-102M, any one or more of servers 106A-106N, application developer system 110, custom code-enabled BaaS module 108, interface 202, resource provider 204, runtimes 210A-210C, request pipeline 212, third-party module(s) 214, service(s) 216, auto-load logic 402, resource provider 402, runtime 404, provisioning logic 406, auto-load logic 408, execution logic 410, and/or flowchart 300 may be implemented as computer program code configured to be executed in one or more processors.

In another example, any one or more of user systems 102A-102M, any one or more of servers 106A-106N, application developer system 110, custom code-enabled BaaS module 108, interface 202, resource provider 204, runtimes 210A-210C, request pipeline 212, third-party module(s) 214, service(s) 216, resource provider 402, runtime 404, provisioning logic 406, auto-load logic 408, execution logic 410, and/or flowchart 300 may be implemented as hardware logic/electrical circuitry.

For instance, in an embodiment, one or more of user systems 102A-102M, one or more of servers 106A-106N, application developer system 110, custom code-enabled BaaS module 108, interface 202, resource provider 204, runtimes 210A-210C, request pipeline 212, third-party module(s) 214, service(s) 216, resource provider 402, runtime 404, provisioning logic 406, auto-load logic 408, execution logic 410, and/or flowchart 300 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Example Computer System

Figure 5:
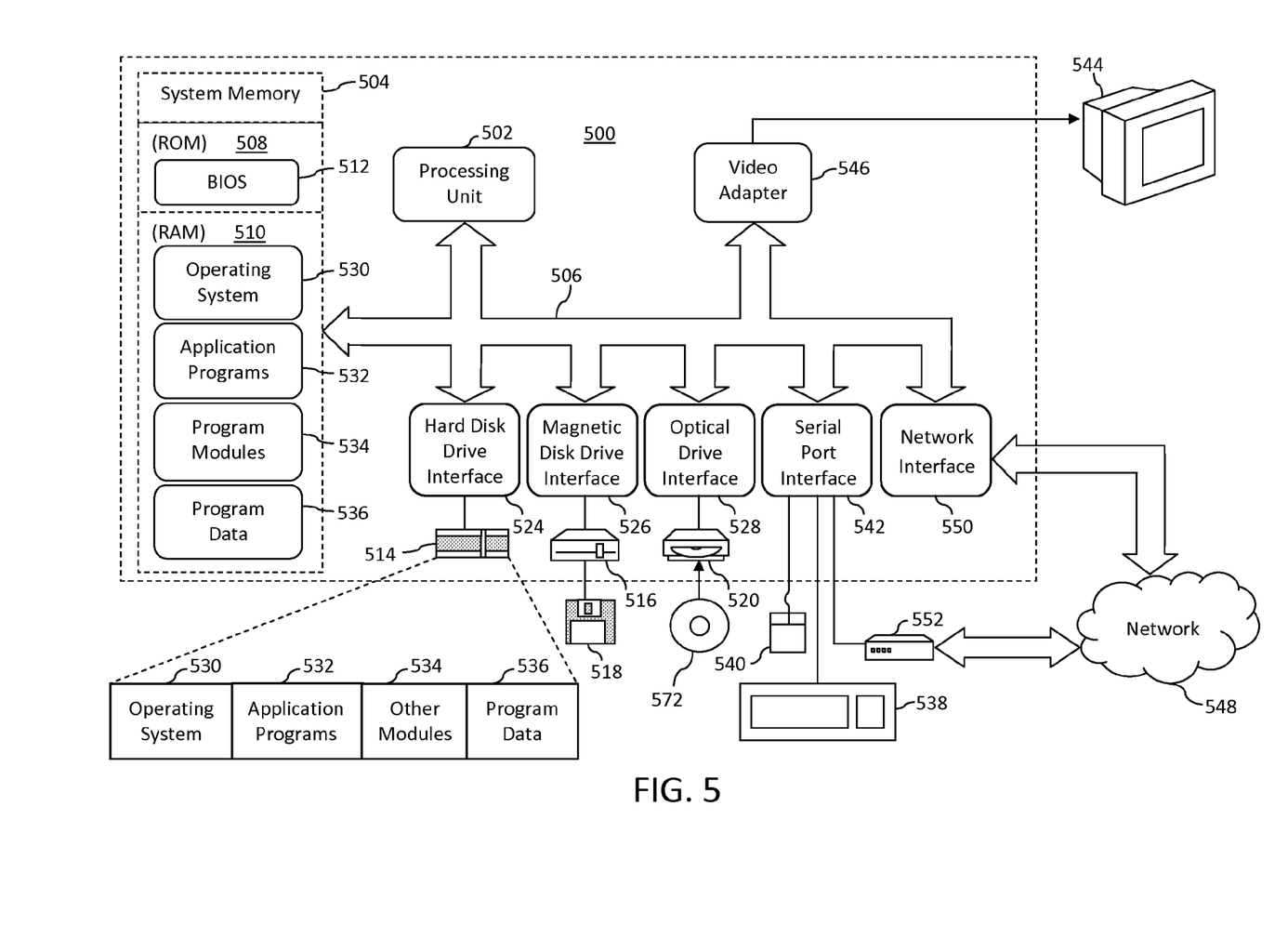
FIG. 5 depicts an example computer in which embodiments may be implemented.

FIG. 5 depicts an example computer 500 in which embodiments may be implemented. Any one or more of user systems 102A-102M, any one or more of file servers 106A-106N, and/or application developer system 110 shown in FIG. 1 may be implemented using computer 500, including one or more features of computer 500 and/or alternative features. Computer 500 may be a general-purpose computing device in the form of a conventional personal computer, a mobile computer, or a workstation, for example, or computer 500 may be a special purpose computing device. The description of computer 500 provided herein is provided for purposes of illustration, and is not intended to be limiting. Embodiments may be implemented in further types of computer systems, as would be known to persons skilled in the relevant art(s).

As shown in FIG. 5, computer 500 includes a processing unit 502, a system memory 504, and a bus 506 that couples various system components including system memory 504 to processing unit 502. Bus 506 represents one or more of any of several types of bus structures, including a memory bus or memory controller, a peripheral bus, an accelerated graphics port, and a processor or local bus using any of a variety of bus architectures. System memory 504 includes read only memory (ROM) 508 and random access memory (RAM) 510. A basic input/output system 512 (BIOS) is stored in ROM 508.

Computer 500 also has one or more of the following drives: a hard disk drive 514 for reading from and writing to a hard disk, a magnetic disk drive 516 for reading from or writing to a removable magnetic disk 518, and an optical disk drive 520 for reading from or writing to a removable optical disk 522 such as a CD ROM, DVD ROM, or other optical media. Hard disk drive 514, magnetic disk drive 516, and optical disk drive 520 are connected to bus 506 by a hard disk drive interface 524, a magnetic disk drive interface 526, and an optical drive interface 528, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 530, one or more application programs 532, other program modules 534, and program data 536. Application programs 532 or program modules 534 may include, for example, computer program logic for implementing any one or more of custom code-enabled BaaS module 108, interface 202, resource provider 204, runtimes 210A-210C, request pipeline 212, third-party module(s) 214, service(s) 216, resource provider 402, runtime 404, provisioning logic 406, auto-load logic 408, execution logic 410, and/or flowchart 300 (including any step of flowchart 300), as described herein.

A user may enter commands and information into the computer 500 through input devices such as keyboard 538 and pointing device 540. Other input devices (not shown) may include a microphone, joystick, game pad, satellite dish, scanner, touch screen, camera, accelerometer, gyroscope, or the like. These and other input devices are often connected to the processing unit 502 through a serial port interface 542 that is coupled to bus 506, but may be connected by other interfaces, such as a parallel port, game port, or a universal serial bus (USB).

A display device 544 (e.g., a monitor) is also connected to bus 506 via an interface, such as a video adapter 546. In addition to display device 544, computer 500 may include other peripheral output devices (not shown) such as speakers and printers.

Computer 500 is connected to a network 548 (e.g., the Internet) through a network interface or adapter 550, a modem 552, or other means for establishing communications over the network. Modem 552, which may be internal or external, is connected to bus 506 via serial port interface 542.

As used herein, the terms "computer program medium," "computer-readable medium," and "computer-readable storage medium" are used to generally refer to media such as the hard disk associated with hard disk drive 514, removable magnetic disk 518, removable optical disk 522, as well as other media such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

As noted above, computer programs and modules (including application programs 532 and other program modules 534) may be stored on the hard disk, magnetic disk, optical disk, ROM, or RAM. Such computer programs may also be received via network interface 550 or serial port interface 542. Such computer programs, when executed or loaded by an application, enable computer 500 to implement features of embodiments discussed herein. Accordingly, such computer programs represent controllers of the computer 500.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A method comprising:
   receiving custom code for incorporation into a backend-as-a-service module that is configured to provide a backend service to a corresponding application; and
   in response to receipt of a request from the corresponding application, automatically loading the custom code, which is operable to access code modules that are external to the custom code, dynamically in a runtime hosted by the backend-as-a-service module while the runtime is running to provide custom backend features that are defined by the custom code to the corresponding application.

2. The method of claim 1, wherein the runtime is a native runtime of the custom code.

3. The method of claim 1, wherein automatically loading the custom code dynamically in the runtime comprises:
   automatically loading the custom code, which is operable to explicitly invoke a default operation and to modify one or more inputs of the default operation before the default operation is performed, dynamically in the runtime while the runtime is running.

4. The method of claim 1, wherein automatically loading the custom code dynamically in the runtime comprises:
   automatically loading the custom code, which is operable to explicitly invoke a default operation and to modify one or more outputs of the default operation after the default operation is performed, dynamically in the runtime while the runtime is running.

5. The method of claim 1, wherein automatically loading the custom code dynamically in the runtime comprises:
   automatically loading the custom code, which is operable to call into the runtime to use one or more services that are provided by the runtime, dynamically in the runtime while the runtime is running.

6. The method of claim 1, further comprising:
   isolating the runtime from other runtimes in the back-end-as-a-service module such that the other runtimes do not have access to the custom code and do not have access to data on which the custom code operates.

7. The method of claim 1, further comprising:
   provisioning a website, a database, and a set of uniform resource identifiers that correspond to the custom code in response to receiving the custom code;
   receiving a URI request at the back-end-as-a-service module that identifies at least one of the uniform resource identifiers in response to receipt of the request from the corresponding application; and
   executing the custom code in response to receiving the URI request.

8. The method of claim 1, wherein automatically loading the custom code comprises:
   automatically loading the custom code dynamically in the runtime without necessitating that the runtime be reloaded.

9. A system comprising:
   one or more processors;
   an interface configured to receive custom code, which is operable to explicitly invoke a default operation and to modify one or more outputs of the default operation after the default operation is performed, for incorporation into a backend-as-a-service module that is configured to provide a backend service to a corresponding application; and
   auto-load logic, implemented using at least one of the one or more processors, configured to automatically load the custom code dynamically in a runtime hosted by the backend-as-a-service module while the runtime is running to provide custom backend features that are defined by the custom code to the corresponding application in response to receipt of a request from the corresponding application.

10. The system of claim 9, wherein the runtime is a native runtime of the custom code.

11. The system of claim 9, wherein the custom code is operable to access third-party code modules that are external to the custom code.

12. The system of claim 9, wherein the custom code is operable to explicitly invoke a default operation and to modify one or more inputs of the default operation before the default operation is performed.

13. The system of claim 9, wherein the custom code is operable to call into the runtime to use one or more services that are provided by the runtime.

14. The system of claim 9, wherein the runtime is isolated from other runtimes in the back-end-as-a-service module such that the other runtimes do not have access to the custom code and do not have access to data on which the custom code operates.

15. The system of claim 9, further comprising:
   provisioning logic configured to provision a website, a database, and a set of uniform resource identifiers that correspond to the custom code in response to receipt of the custom code; and
   execution logic configured to execute the custom code in response to receipt of the request from the corresponding application and further in response to receipt of a URI request that identifies at least one of the uniform resource identifiers.

16. The system of claim 9, wherein the runtime is configured to monitor the custom code while the custom code runs to determine whether at least one of a failure of the custom code or a bug in the custom code causes the corresponding application to become unresponsive.

17. A computer program product comprising a computer-readable storage medium having computer program logic recorded thereon for enabling a processor-based system to providing backend custom code extensibility, the computer program product comprising:
   a first program logic module for enabling the processor-based system to automatically load custom code, which is configured for incorporation into a backend-as-a-service module, dynamically in a runtime hosted by the backend-as-a-service module while the runtime is running to provide custom backend features that are defined by the custom code to a corresponding application in response to receipt of a request from the corresponding application, the backend-as-a-service module configured to provide a backend service to the corresponding application;

a second program logic module for enabling the processor-based system to provision a website, a database, and a uniform resource identifier that correspond to the custom code in response to receipt of the custom code; and a third program logic module for enabling the processor-based system to execute the custom code in response to receipt of the request from the corresponding application and further in response to receipt of a URI request that identifies the uniform resource identifier.

18. The computer program product of claim 17, wherein the runtime is a native runtime of the custom code.

19. The computer program product of claim 17, wherein the custom code is operable to access third-party code modules that are external to the custom code.

20. The computer program product of claim 17, wherein the custom code is operable to call into the runtime to use one or more services that are provided by the runtime.

* * * * *